United States Patent Office 3,725,200
Patented Apr. 3, 1973

3,725,200
PROCESS FOR FERMENTATIVE PRODUCTION
OF YEAST CELLS
Kiyoshi Watanabe, Takasag, Yoshio Shimada, Hajime
Kawaharada, and Kenji Suzuki, Kakogawa, and Fumio
Tanaka, Kobe, Japan, assignors to Kanegafuchi Kagaku
Kogyo Kabushiki Kaisha, Osaka, Japan
No Drawing. Filed July 7, 1970, Ser. No. 53,024
Claims priority, application Japan, Mar. 3, 1970,
45/18,562
Int. Cl. C12d 13/06; C12b 1/00
U.S. Cl. 195—28 R                                12 Claims

ABSTRACT OF THE DISCLOSURE

Process for producing yeast cells having high protein content in which a novel strain, Candida novellus is cultivated under aerobic condition in an aqueous nutrient medium containing n-paraffins or n-paraffin-containing hydrocarbons. The process ensures high yield of yeast cells, high protein content of the cells and increased cell productivity.

---

This invention relates to a process for producing yeast cells having high protein content by cultivating a new species Candida novellus (ATCC number 20275) using a hydrocarbon as a carbon source.

Samples of the new species have been deposited with the American Type Culture Collection, Rockville, Md., and have received the designation ATCC 20275. They may be obtained by the public without the permission of applicant.

A host of microorganisms which assimilate hydrocarbons are known in the art. In recent years, many proposals have been made for the production of microbial cells using petroleum as a raw material. The known yeast strains produced therefrom, however, are not satisfactory from the standpoint of yield, protein content and growth rate of yeast cells. Thus there have been difficulties in employing these prior art methods to the commercial production of yeast cells.

From numerous soil samples collected from a variety of different locations, we set out to isolate yeasts which might have an excellent ability to assimilate hydrocarbons, grow at a high rate, and produce cells having high protein content. The work resulted in discovery of one yeast strain superior to the known strains in the above-mentioned respects and suitable for the commercial production of yeast cells having high protein content. By taxonomic examination, the strain was found to be a new species. It has been found that yeast cells with high protein content can be obtained by cultivating this new species in a hydrocarbon culture medium.

The new yeast used in the present invention has the following microbiological properties.

(I) MORPHOLOGICAL PROPERTIES (1) Vegetative cells: After three days in a malt-extract at 25° C., cells were of round to oval shape having a size of 3–6 x 4–8μ. Reproduction was by multilateral budding.
(2) Ascospores: Not found on any of the following, gypsum block, Gorodkowa agar, carrot plug, V–8 agar and sodium acetate agar.
(3) Mycelia (pseudomycelia), blastospores, etc.: Pseudomycelia were well developed on a slide of a potato agar, and blastospores and blastoconidia were also formed well.
(4) Colony: After one month at 17° C., the streak culture was found to be raised, cream-colored, smooth and glistening with an entire edge.

(II) PHYSIOLOGICAL PROPERTIES (1) Optimum growth conditions: pH 5.0, temperature 30° C., aerobic
(2) Growth conditions: pH 2.5 to 9.0, temperature 2° C. to 39° C.
(3) Assimilation of nitrate: Absent
(4) Reaction in litmus milk: No coagulation; the color changed to blue
(5) Resistance to osmotic pressure (on 10% NaCl medium): Absent
(6) Liquefaction of gelatin: Positive
(7) Vitamin requirement: Required biotin
(8) Formation of carotinoid pigments: Absent
(9) Utilization of ethanol: Positive
(10) Splitting of arbutin: Positive
(11) Formation of ester: Absent
(12) Formation of a starch-like substance: Absent
(13) Acid formation: Absent
(14) Utilization of a nitrogen source: Any of the following is utilized, peptone, ammonium sulfate, urea and asparagin
(15) Pellicle formation: After one month in a malt-extract at 17° C., a ring is formed
(16) Fermentation: Glucose (+), galactose (weak), saccharose (+), maltose (very weak) lactose (−), raffinose (−)
(17) Utilization of a carbon source: Glucose (+), mannose (+), galactose (+), fructose (+), lactose (−), saccharose (+), maltose (+), trehalose (+), raffinose (−), aesculin (+), α-methyl glucoside (+), dextrin (−), starch (−), inulin (+), melibiose (−), xylose (+), arabinose (−)

A comparative study of the above-mentioned morphological and physiological properties was made on the basis of Lodder et al. The Yeasts, A Taxonomic Study, 1952. It was found that the three strains, Candida tropicalis, Candida guilliermondii, and Candida parapsilosis may somewhat resemble the new species used in the present invention. It is clear however that the new species differ from Candida tropicalis in ability to assimilate starch. The new species differ from Candida guilliermondii in ability to ferment and assimilate raffinose, ability to assimilate arabinose, and reaction in litmus milk. Also, the new species differ from Candida parapsilosis in ability to ferment saccharose, and ability to assimilate arabinose and salicin.

The stability of fermentative properties of the new species was checked. An antigen analysis of the strains was made for a more strict identification in accordance with the serological method described in The Japan Journal of Medical Mycology, pages 179–190, vol. 10, No. 3, November 1969. As a result, the antigen structure of the novel strain used in the present invention was found to be heat resistant antigen 1, 2, 3, 4, 13.

Comparison of this with the antigen structures of the biologically related species revealed the following results.

Novel strain of the invention: 1, 2, 3, 4, 13
Candida guilliermondii: 1, 2, 3, 4, 9
Candida tropicalis: 1, 2, 3, 4, 5, 6
Candida parapsilosis: 1, 2, 3, 5, 13, 14 15

These results indicate that the new species used in the present invention clearly differ in antigen structure from the three closely related species mentioned above. Accordingly the strain used in the present invention was identified as a new species, and named Candida novellus.

The present invention provides a process for obtaining yeast cells with high protein content by cultivating the novel yeast, Candida novellus (ATCC 20275) under aerobic conditions in an aqueous nutrient medium containing n-paraffins or n-paraffin-containing hydrocarbons as the main carbon source, to produce high yields of hydrocarbon-assimilating yeast cells; separating the cells; and then washing them with water.

In accordance with the present invention, the cultivation may be performed either batchwise or continuously. For mass production of the yeast cells, a continuous cultivation method is usually employed.

The raw material is a carbon source which is mainly composed of n-paraffins or n-paraffin-containing hydrocarbon. The n-paraffins are those having 9 to 30 carbon atoms per molecule which are obtained by the molecular sieve method, the urea adduct method, etc. The n-paraffines are, for example, kerosene, gas, oil or crude n-paraffines which is refined in a process for preparing petroleum fractions and contain more than 50% by weight of n-paraffin. The concentrations of n-paraffins in the continuous cultivation is usually from 0.01% to 1% of the total medium. As used herein, the concentrations are stated as percents for convenience and are measured in grams of substance dissolved in 100 ml. of medium. The cultivation temperature may range from 25° C. to 40° C., and preferably from 27° C. to 35° C. The pH of the culture medium may be from 3.5 to 6.0, and preferably from 4.0 to 5.0. The pressure may be atmospheric or other suitable fixed or variable pressure. The period of cultivation depends on various factors, but should be sufficient to obtain desired results.

The culture medium may also comprise a minor growth factor and inorganic substances other than carbon sources. As the minor growth factor, it is favorable to add, because the strain used in the present invention requires biotin, a trace of biotin or a homologue there are having the same kind of physiological activity as biotin, for example desthiobiotin, or biotin-containing material (such as those containing from 0.02% to 0.5% by weight biotin) such as molasses, yeast extracts, or corn steep liquor. As supplemental raw materials, the following may be used: potassium, magnesium, zinc or iron source such as potassium chloride, magnesium sulfate, zinc sulfate, ferrous sulfate or ferric sulfate as well as, in the same way as in an usual cultivation of yeast; a nitrogen source such as ammonia, ammonium sulfate or urea; and a phosphoric acid source such as phosphoric acid, monosodium phosphate, disodium phosphate, monopotassium phosphate or dipotassium phosphate. Depending upon the condition of the cultivation, a suitable antifoaming agent such as soybean oil, silicon resins or fatty acid derivatives may conveniently be added. During the cultivation, a gas containing free oxygen is aerated into the culture medium.

Although, as mentioned above, the conditions for cultivating the strain of the invention are not special, the use of a cultivating apparatus having a high coefficient of oxygen absorption rate is preferred in order to increase the yield, the protein content and cell productivity of yeast cells.

The present invention is illustrated, but not limited by the following examples.

EXAMPLE 1

Two hundred (200) milliliters of a culture medium consisting of 2% of n-paraffin (purity 98% by weight, $C_{10-21}$), 0.2% of phosphoric acid, 0.2% of KCl, 0.06% of ammonium sulfate, 0.2% of urea, 0.06% of $$MgSO_4 \cdot 7H_2O$$

30 p.p.m. of $ZnSO_4 \cdot 7H_2O$, 50 p.p.m. of $FeSO_4 \cdot 7H_2O$, 100 p.p.m. of $CaCl_2 \cdot 2H_2O$, 0.1% of molasses, and tap water (neutralized to pH 6.0 by NaOH) was poured into each of four 2-liter shaking flasks. This was followed by autoclaving and adjustment of the pH of the medium to 6.0. The percentages are of the total medium i.e. grams per 100 ml. *Candida novellus, Candida tropicalis, Candida lipolytica,* and *Pichia miso mogii* were inoculated in the respectively culture medium. Each of the strains was subjected to shaking cultivation for 24 hours to form a seed culture. Twenty (20) liters of a nutrient liquid having the same composition as that of the culture medium mentioned above but containing no urea were put into each of four 30-liter jar fermenter, and sterilized for 15 minutes at 120° C. After the pH was adjusted to 6.0, six hundred (600) milliliters of each of the seed cultures was inoculated in the respective nutrient liquid contained in the jar fermenter. A 5% aqueous ammonia was added to maintain the pH of the nutrient liquid at 4.5. The cultivation was performed at 30° C. with stirring at 700 r.p.m. while aerating with oxygen containing gas (e.g. air) at a rate of 30 liters per minute. After ammonia consumption stopped, the resulting cells were separated, and washed with water. The yield of the cells, the crude protein content and the growth rate were measured, and the results are shown in the following Table 1. Substantial improvement in yield, protein content and growth rate were noted for the present species.

TABLE 1

| Species | Yield of the cells based on n-paraffin (percent)[1] | Crude protein content (percent)[2] | Growth rate (hr.⁻¹) |
|---|---|---|---|
| *Candida novellus* | 105.6 | 57.8 | 0.29 |
| *Candida tropicalis* | 98.2 | 54.8 | 0.26 |
| *Candida lipolytica* | 101.5 | 45.6 | 0.23 |
| *Pichia miso mogii* | 105.3 | 43.2 | 0.24 |

[1] As used herein, cell yield (percent) is measured by $A/B \times 100$, where A = grams of formed yeast cells and B = grams of consumed n-paraffin.
[2] As used herein, crude protein content (percent) is measured in grams of crude protein per 100 grams of yeast cells.

EXAMPLE 2

The same seed cultures, nutrient liquid for main cultivation (except that yeast extract was used instead of molasses) and strains as set forth in Example 1 were used, and each of the seed cultures was transferred to a jar fermenter. At the logarithmic growth phase, the cultivation was changed to continuous cultivation. During the continuous cultivation, a nutrient liquid of the same composition as that of the nutrient liquid set forth in Example 1 but containing no n-paraffin was continuously added with a separate continuous supply of n-paraffin (purity 99% by weight, $C_{15-23}$), while maintaining the concentration of the cells at from 1.7% to 1.9% and the concentration of the n-paraffin substrate at from 0.1% to 0.3%, both percentages being in terms of the total medium. The cultivation was performed at 33° C. with stirring at 1000 r.p.m. while aerating with oxygen containing gas (e.g. air) at a rate of 30 liters per minute and maintaining the pH at 4.5. The pH and the temperature were automatically controlled. The condition of the continuous cultivation was good, and the cultivation was stopped at the end of a period of 200 hours. The results obtained are tabulated below in Table 2.

TABLE 2

| Species | Yield of cells based on n-paraffin (percent) | Crude protein content (percent) | Cell productivity (g./l./hr.) |
|---|---|---|---|
| *Candida novellus* | 106.5 | 58.1 | 4.2 |
| *Candida tropicalis* | 99.1 | 52.4 | 3.4 |
| *Candida lipolytica* | 100.1 | 46.5 | 2.8 |
| *Pichia miso mogii* | 103.9 | 44.5 | 3.5 |

Again the substantial improvement in yield, protein content, and cell productivity produced with the inventive species are evident.

EXAMPLE 3

A seed cultivation and a continuous cultivation were performed under the same conditions as in Example 2 using *Candida novellus*. However, as a basal continuous cultivating liquid, a medium was used which is the same nutrient liquid as in Example 2 with the exception that yeast extracts were omitted. Biotin, corn steep liquor, yeast extract, and molasses were respectively added to the medium. The cultivation was performed continuously for 120 hrs. The results obtained were shown in the following Table 3.

TABLE 3

| Addition to the basal culture medium | Concentration | Yield of cells based on n-paraffin (percent) | Crude protein content (percent) | Cell productivity (g./l./hr.) |
|---|---|---|---|---|
| None | | Doesn't multiply [1] | | |
| Biotin, γ/l | 3 | 105.5 | 57.0 | 4.0 |
| Biotin, γ/l | 10 | 103.0 | 57.9 | 4.3 |
| Corn steep liquor, percent | 0.2 | 101.5 | 58.2 | 4.7 |
| Yeast extracts, percent | 0.05 | 106.0 | 57.0 | 4.1 |
| Molasses, percent | 0.1 | 103.0 | 56.8 | 4.5 |

[1] Multiplication stopped after 32 hrs. of continuous cultivation.

NOTE.—γ=gm. (microgram).

It is understood that the foregoing is only illustrative of the principles of the invention and that numerous other changes and modifications would be obvious to the worker skilled in the art without departing from the spirit and scope of this invention.

What is claimed is:

1. Process for producing yeast cells by cultivating a new species, *Candida novellus* designated ATCC 20275 under aerobic conditions in an aqueous nutrient medium containing either n-paraffins or n-paraffin-containing hydrocarbons.

2. Process according to claim 1 wherein said n-paraffin has 9 to 30 carbon atoms per molecule.

3. Process according to claim 1 wherein said aqueous nutrient medium contains a biotin source selected from the group consisting of biotin, molasses, yeast extracts and corn steep liquor.

4. Process according to claim 1 wherein said aqueous nutrient medium contains a nitrogen source, a phosphoric acid source and mineral salts of potassium, magnesium, iron and zinc.

5. Process according to claim 1 wherein the pH of said aqueous nutrient medium is maintained at from 3.5 to 6.0.

6. Process according to claim 1, wherein said cultivating is carried out at a range from 25° C. to 40° C.

7. Process according to claim 1 wherein said cultivating is carried out continuously while maintaining the concentration of said n-paraffins or said n-paraffin-containing hydrocarbons in said aqueous nutrient medium at from 0.01% to 1%.

8. Process according to claim 1, wherein said medium comprises antifoaming agent selected from the group consisting of soybean oil, silicon resins and fatty acid derivatives.

9. Process for obtaining yeast having high protein content comprising the steps of cultivating *Candida novellus* ATCC 20275 in an aqueous medium containing
   (a) as a main carbon source either n-paraffins or n-paraffins containing hydrocarbons
   (b) biotin or homologues thereof,
   (c) sources of potassium, magnesium, zinc and iron,
   (d) source of nitrogen, and
   (e) source of phosphoric acid,
   said medium being maintained at a pH of between 3.5 to 6.0, and at a temperature of from 25° C. to 40° C. and being aerated by use of a gas containing free oxygen.

10. Process according to claim 9, wherein said medium further comprises an antifoaming agent selected from the group consisting of soybean oil, silicon resins and fatty acid derivatives.

11. Process according to claim 9, wherein said cultivating is carried out continuously and said carbon source is in a concentration of from 0.01% to 1%.

12. Process of claim 9, wherein said carbon source is in an amount of 2% of said medium.

References Cited

UNITED STATES PATENTS

| 3,268,413 | 8/1966 | Laine et al. | 195—28 R X |
| 3,411,989 | 11/1968 | Nakao et al. | 195—82 X |
| 3,595,749 | 7/1971 | Clark et al. | 195—28 R |

JOSEPH M. GOLIAN, Primary Examiner

U.S. Cl. X.R.

195—82